United States Patent

[11] 3,613,054

[72] Inventor Carl A. Ricard
Hudson, N.H.
[21] Appl. No. 882,249
[22] Filed Dec. 4, 1969
[45] Patented Oct. 12, 1971
[73] Assignee Sanders Associates, Inc.
Nashua, N.H.

[54] SCANNING ENCODER
10 Claims, 1 Drawing Fig.

[52] U.S. Cl. .......... 340/172.5
[51] Int. Cl. .......... H03k 13/00
[50] Field of Search .......... 340/172.5, 348, 365; 178/2, 3

[56] References Cited
UNITED STATES PATENTS
3,496,563 2/1970 Staples et al. .......... 340/348

*Primary Examiner*—Raulfe B. Zache
*Attorney*—Louis Etlinger

ABSTRACT: A scanning encoder comprises a code-generating means such as a binary counter which directly outputs a desired code to a decoder which produces a pulsed output which is unique to each of a sequence of asynchronous events. The decoder output signals are coupled to an event indicator which indicates the happening of any given event in the sequence. In an application to a data input keyboard the closure of a given key provides a conducting path whereby the decoder pulse for the corresponding code is directed as an enable signal to a register. Application of the enable signal to the register permits entry of the corresponding code from the counter through the register to a data output terminal. A shift means is provided to manipulate selected data bits to obtain for example upper and lower case characters or the like.

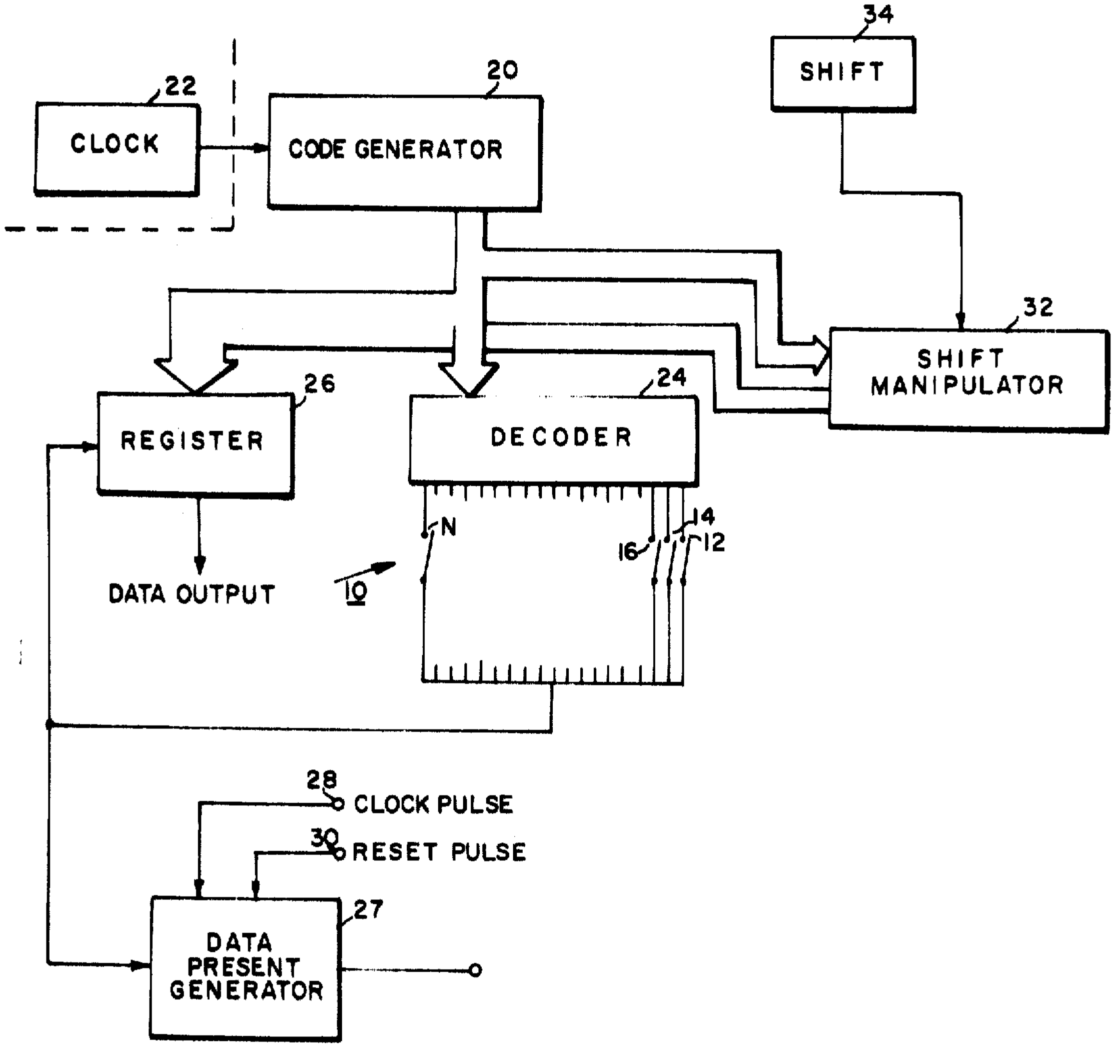
INVENTOR
CARL A. RICARD
BY Robert Van Epps
AGENT

SCANNING ENCODER

BACKGROUND OF THE INVENTION

1. Field of the Invention

The present invention relates most generally to the field of data processing and more particularly to an improved scanning encoder for data input apparatus.

2. Description of the Prior Art

In many data processing applications it is desirable to convert the happening of an event in a sequence of asynchronous events into coded information suitable for digital processing. A prime example of such an application is the closure of a key on a data input keyboard. Another such example is the closure of a control switch on a panel in a variety of computer-controlled manufacturing processes. The most commonly used approach has been to provide each key, switch or other means for indicating the happening of an event, with individual encoding means. In applications such as data input keyboards the provision of one or in many cases two encoders for each individual key obviously becomes a complex and expensive approach. An improvement has been provided by the introduction by Fairchild Semiconductor of Mountain View, California, of a scanning keyboard encoder which is described in the May, 1969issue of EEE (pp. 24–25). This scanning encoder, however, requires the use of a scanning multiplexer coupled in a diode matrix to the output of a decoder; each key having its own diode. Encoders of this type have been satisfactory in use, however, their relative expense may limit their application to a variety of data input problems. The required diode matrix element generally requires the manual insertion of the individual diodes into the matrix and thus precludes automation of the assembly and thus requires that expensive labor costs be included in the overall expense of the encoder.

OBJECTS AND SUMMARY OF THE INVENTION

It is therefore a primary objective of the present invention to provide a new and novel scanning encoder.

It is another object of the present invention to provide apparatus of the above-described character which is of improved economy of construction.

It is also an object of the present invention to provide apparatus of the above-described character having all integrated circuit construction.

It is a further objective of the present invention to provide apparatus of the above-described character which is amenable to automatic fabrication.

It is an additional object of the present invention to provide apparatus of the above-described character wherein any requirement for a diode matrix assembly is eliminated.

It is still another object of the present invention to provide apparatus of the above-described character which is suitable for use with a data input keyboard.

It is yet a further object of the present invention to provide apparatus of the above-described character which requires no self-contained timing apparatus.

It is still an additional object of the present invention to provide apparatus of the above-described character which is amenable for use in providing a data input to a conventional television receiver.

These and other objectives of the present invention are achieved by providing a counter which generates a preselected binary code. The code is applied directly to a decoder which provides a pulsed output; each pulse beginning sequentially later in time than the previous pulse. Each decoder output is coupled to an element of an event indicator such as the individual keys on a data input keyboard or the control panel of a computer-controlled processing apparatus. Thus the elements of the event indicator are repetitively scanned in a preselected sequence by the decoder output. When a particular event occurs such as a key closure the decoder output pulse for that particular code is coupled through the event indicator to a register which also has as an input the binary code from the code generator. The decoder output pulse operates as an enable signal which permits entry of the corresponding code into the register. A shift means is also coupled to the code generator and is operative to manipulate selected bits of the binary code to effect switching between alternative data inputs controlled by a single event indicator such as the upper and lower case of an alphanumeric display.

These and other objects, features and advantages of the present invention will become more apparent from the following detailed description taken in conjunction with the appended drawing.

BRIEF DESCRIPTION OF THE DRAWING

The single appended FIGURE is a schematic block diagram of a scanning encoder fabricated in accordance with the principles of the present invention.

DESCRIPTION OF PREFERRED EMBODIMENT

Turning now to the appended drawing there is illustrated in schematic block diagram form an embodiment of the present invention whereby the activation of an event indicator is converted to binary-coded information. For the purposes of illustration block arrows are used to indicate multiple data lines and single lines are used to illustrate control signal paths. An event indicator 10 includes a plurality of event-indicating elements which are illustrated for purposes of clarity as a series of single-pole switches, 12, 14, 16 through N. The event indicator may be dependent for activation on any external, sequential asynchronous event such as depression by an operator of the keys of a data input keyboard, or operation of switching within a control panel of any description. The description of the invention presented herein below will be couched in terms of the event indicator being a keyboard for the purposes of discussion only and it is not intended that the application of the invention be so restricted.

A code generator 20 such as a binary or decimal counter generates a plurality of preselected codes at a frequency which is controlled by a clock 22 which may be external to the encoder itself. A suitable binary code could, for example, be a seven-bit ASCII code; 64 of which may be used in the application of the invention to keyboard encoding. As the codes are generated by the generator 20 they are applied directly to a decoder 24. The outputs of the decoder 24 are pulses; each pulse starting sequentially later in time than the previous pulse. Each output of the decoder 24 is coupled to one of a plurality of event-indicating elements or keys 12, 14, 16...N. Thus each key is sequentially scanned by the decoder output. When a given key is closed by an operator the pulse generated by the decoder 24 for the particular code is coupled through the key and is applied to a register 26 as an enable signal. In addition to being directly coupled to the decoder 24 the code generator 20 output is coupled to the register 26. The presence of an enabling pulse from the keyboard operates to enter the corresponding code from generator 20 into the register 26. Obviously the propagation time of the enable pulse from the keyboard 10 to the register 26 will be less than the rate at which the generator 20 operates.

The decoder pulse for the particular key is also applied to a data present generator 27 which also has applied thereto timing clock pulses 28 and a reset pulse 30 from appropriate pulsed signal sources external to the encoder itself.

The use of the decoder 24 output pulse as an enable signal assures that only the first-received code will be entered into the register and repetitive entry of a particular code resulting from a single depression of the corresponding key is thus precluded.

It will be apparent that the present invention may be operative with no self-contained timing apparatus. It is in this sense that the present invention is very amenable for use with an inexpensive keyboard and a conventional commercial television receiver to thereby provide an inexpensive data display system such as might be used in a time-shared computer terminal. The horizontal sync signal may be coupled as a clock signal from the receiver to the code generator 20 and the vertical sync signal may be coupled as a reset signal to the data present generator. For example, assuming a 7-bit ASCII code and a 64-key keyboard each code is outputted; i.e. the entire keyboard is scanned, four times during a vertical sync since the horizontal sync is 256 times the rate of the vertical sync. It will thus be seen that the present invention is readily adaptable for use with raster-scan-type displays as used in conventional television receivers.

The use of a binary counter and decoder with an ASCII code is preferred in the practice of the present invention, however, it will be apparent that any other system such as one having a decimal base could be used with an appropriate code. It is also to be understood that other means for generating the desired sequential-coded signals may also be used in the practice of the invention. Examples of such alternative means include precoded magnetic drums, recirculating delay lines or electro-optical devices all of which are adaptable to produce the desired coded signals for application to a compatible decoding means.

A shift means may also be provided where a single given indicator may be activated by alternative events. This feature of the invention when applied to keyboard encoding contemplates means for shifting between upper and lower case alphanumeric symbols or other alternative data inputs which may be controlled by a single event indicator. Selected bits of each code generated by code generator 20 are applied to a shift manipulator gate structure 32. This gate structure may in practice comprise an AND gate for each code bit to be manipulated having as its inputs the code bit and the output of a shift bar 34. The AND gate output may be inverted to form the output signal of the shift manipulator gate structure 32. This output signal is then coupled with the direct binary counter 20 output and applied to the register 26. Simultaneous depression by an operator of a given key and the shift bar 34 applies an enabling pulse to the register 26 and causes the manipulated data bits corresponding to the symbol to be entered into the register 26 directly from the shift manipulator gate structure 32.

It will thus be apparent that the applicant has provided a new and novel scanning encoder of greatly simplified construcure and that the above-stated objectives of the invention are efficiently met. Since certain changes in the foregoing construction will occur to those skilled in the art without departing from the present invention it is intended that all matter contained in the description or shown in the appended drawing shall be interpreted as illustrative and not in a limiting sense.

Having described what is new and novel and desired to secure by Letters Patent, what is claimed is:

1. Apparatus for converting the happening of an event in a sequence of asynchronous events into coded information comprising
   means for repetitively generating a selected sequence of coded signal combinations at a selected frequency,
   a decoder coupled to said generating means and responsive to said coded signals to produce a plurality of sequential-pulsed output signals,
   an event indicator having a plurality of selectively conducting elements each said element being in a conducting state during the happening of a corresponding event and each said element coupled to an individual one of said decoder outputs, and
   a data register coupled to said generating means and to said event indicator such that on the happening of a given event a corresponding pulse from said decoder is coupled through said event indicator to said register to enable the entry of a corresponding coded signal combination from said generating means.

2. Apparatus as recited in claim 1 wherein
   said coded signal generating means is a binary counter.

3. Apparatus as recited in claim 1 wherein
   said coded-signal-generating means comprises a precoded magnetic drum and means for reading said coded signal combinations.

4. Apparatus as recited in claim 1 wherein
   said coded-signal-generating means comprises a recirculating delay line and a source of coded signals coupled to said delay line.

5. Apparatus as recited in claim 2 further including
   clock means coupled to said counter for controlling said coded-signal-generating frequency to said selected value.

6. Apparatus as recited in claim 5 wherein
   said clock means is the horizontal synchronizing circuit of a television-receiving apparatus whereby the horizontal synchronizing pulses of said circuit are applied to said counter.

7. Apparatus as recited in claim 2 wherein
   said event indicator is a data input keyboard and each said selectively conducting element thereof is an individual key.

8. Apparatus as recited in claim 2 further including
   means for shifting between first and second alternative events which are indicated by a common element of said event indicator,
   said shifting means including a shift control element having a normal position and an activated position corresponding to said first and second events and a shift manipulation means coupled to said counter and adapted to receive selected bits of the corresponding coded signal combination whereby said selected bits are manipulated to indicate said second event, said manipulated bits being coupled from said manipulation means to said register when said shift control element is activated.

9. Apparatus as recited in claim 7 wherein
   said counter comprises eight bits, and
   said sequence of coded signal combinations comprises 64 7-bit ASCII codes.

10. Apparatus as recited in claim 9 wherein
   said selected frequency is sufficiently high that a complete sequence of said coded signal combinations is generated at least once in the time duration of an event indication.